May 20, 1952     J. G. FLEMING     2,596,992
APPARATUS FOR GAS ANALYSIS
Filed April 7, 1945
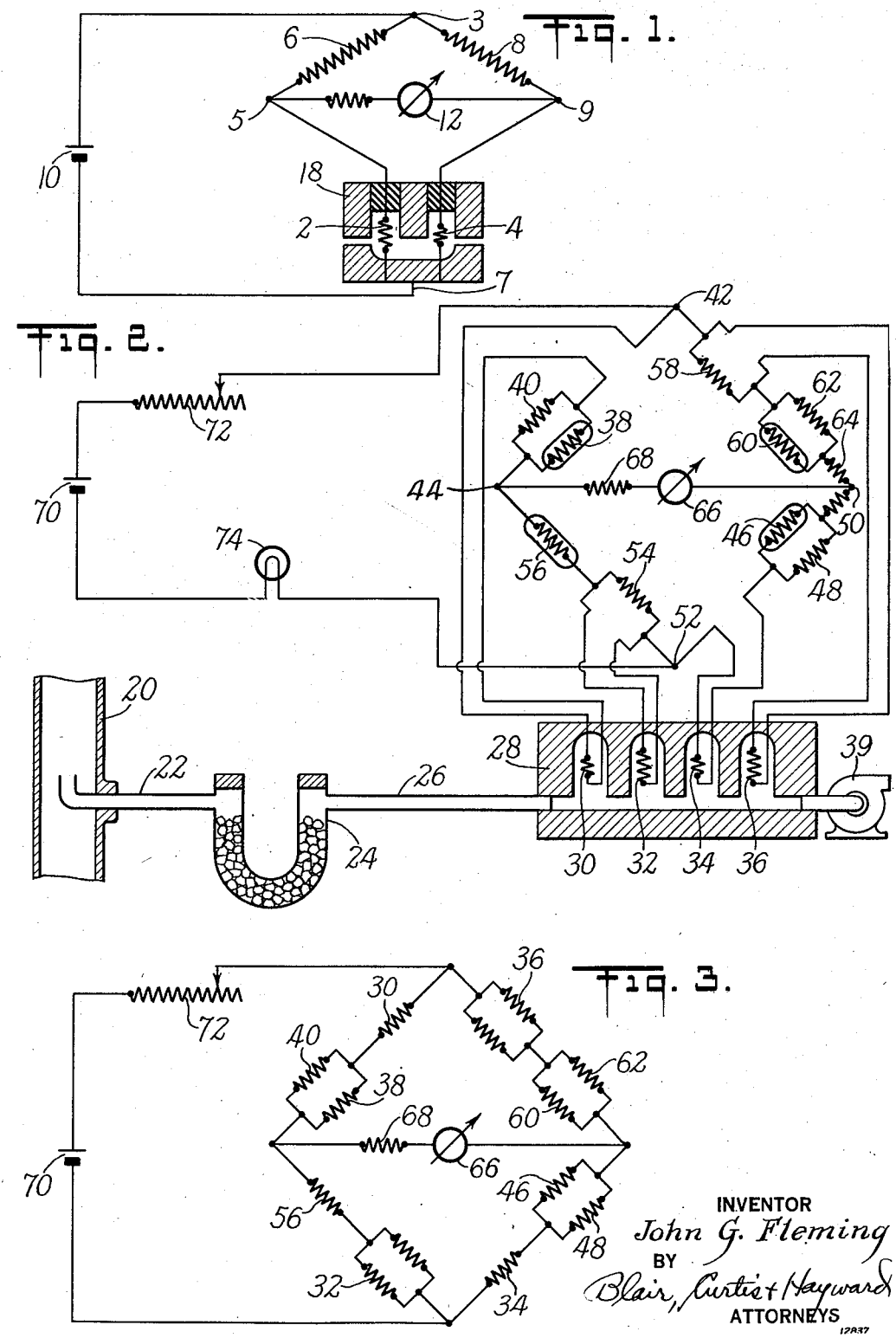
INVENTOR
John G. Fleming
BY
Blair, Curtis & Hayward
ATTORNEYS Patented May 20, 1952

2,596,992

UNITED STATES PATENT OFFICE 2,596,992

APPARATUS FOR GAS ANALYSIS

John G. Fleming, Tarrytown, N. Y., assignor to Cambridge Instrument Company, Inc., New York, N. Y., a corporation of New York Application April 7, 1945, Serial No. 587,148

1 Claim. (Cl. 73—27)

This invention relates to gas analysis by thermal conductivity, and more particularly to apparatus for indicating the relative amount of one or more gases in a gas mixture or for indicating a function or characteristic of the gas mixture which is determined by or identified with the presence of one or more gases in the mixture.

An object of this invention is to provide a simple and sturdy apparatus for gas analysis which is adaptable to a wide range of conditions and uses and which will give accurate results under a wide variety of conditions. A further object is to provide a method for gas analysis or detection which is free of objectionable features of the prior art. Another object is to provide for the indication of a function or characteristic of a gas mixture in direct terms wherein the function or characteristic is determined by or identified with the presence of one or more gases in the mixture. A further object is to provide for the direct indication of such a function or characteristic where the gases effect the function or characteristic by different ratios.

In this specification and the accompanying drawings, I have shown and described a preferred embodiment of my invention; it is to be understood that this is not intended to be exhaustive nor limiting of the invention, but on the contrary is given for purposes of illustration in order that others skilled in the art may fully understand the invention and the principles thereof and the manner of applying it in practical use so that they may modify and adapt it in various forms, each as may be best suited to the conditions of a particular use.

In the drawings:

Figure 1 is a schematic showing of a simplified apparatus embodying the invention;

Figure 2 is a schematic view of an exhaust gas analyzer which is another embodiment of the invention; and, Figure 3 is a simplified representation of the bridge arrangement of Figure 2.

Prior to the present invention the thermal conductivity of gases has been used in gas analysis, the basic principle being the exposure of a heated resistance element to the gas and the measurement of the heat carried away by the gas; this measurement is made by heating the element at a known rate and then determining the temperature by measuring the resistance of the element. For example, the Shakespear katharometer of the type disclosed in United States Patent No. 1,304,208 has enjoyed considerable commercial success, and in fact, is admirably adapted for certain uses. However, such prior art devices are limited in their use and in respect to adaptability to certain conditions of operation. For example, in tertiary gas mixtures, such as air (or nitrogen) having carbon dioxide and hydrogen therein, the carbon dioxide or the hydrogen cannot be measured singularly in a simple manner except where there is a fixed relationship between their relative proportions; this is for the reason that carbon dioxide has a lower thermal conductivity than air, whereas hydrogen has a higher conductivity than air, and if both gases are present, the effect of one will offset the effect of the other so that an indication on the instrument has no definite meaning.

Furthermore, the relative change in thermal conductivity caused by the presence of a given percentage of the various gases is different so that some gases have much different effects on the instrument than do others; for example, the thermal conductivity of hydrogen is much greater than that of air, whereas, the thermal conductivity of carbon dioxide is only slightly less than that of air, and the thermal conductivity of methane is only slightly greater than air. Thus, a small amount of hydrogen causes a much greater change in thermal conductivity than does the same amount of carbon dioxide or methane. In accordance with the present invention a particular gas can be measured with a scale properly calibrated to indicate that particular gas, and the measurement can be made regardless of variations in the percentage of another gas which would normally influence the measurement.

It has been found that a wide variety of gas analysis and detection problems can be solved in accordance with the present invention. For example, an instrument may be provided which indicates a characteristic such as the completeness of combustion of exhaust gas with the combustion characteristic being indicated on an extended scale and with the needle being deflected in a single direction. In accordance with the present invention the fuel-air ratio is measured by relying upon the following characteristics; first, that as the fuel-air ratio becomes too lean (i. e., when there is an excess of air), there is an increasing amount of carbon dioxide in the exhaust gases and little or no hydrogen is present so that the fuel-air ratio throughout the excess air zone is a function of the amount of carbon dioxide present in the exhaust gases; and second, that as the fuel-air ratio becomes too rich (i. e., when there is an excess of fuel), there is an increasing amount of hydrogen in the exhaust gases and a decreasing amount of carbon dioxide present so that the fuel-air ratio throughout the excess fuel zone is a function of the increasing amount of hydrogen and the decreasing amount of carbon dioxide present in the exhaust gases. Thus, in accordance with the present invention during operation of an internal combustion engine, the fuel-air ratio may be measured as it changes from the zone of excess air through the zone of perfect combustion into the zone of excess fuel, and the hand which indicates the fuel-air ratio will move from one end of the scale to the other.

As another example of the present invention, a gas mixture may be analyzed in terms of a characteristic such as the combustibles present in a manner not previously possible. That is, in fuel gas, methane differs from air in its thermal conductivity very much less than does hydrogen, and yet, methane produces much greater heat when burned than does hydrogen. Thus, with a fuel gas containing some nitrogen as an inert medium and variable amounts of hydrogen and methane, simple thermal conductivity measurement will not indicate the B. t. u.'s or calories present because the scale deflection resulting from the presence of hydrogen would be greater presence B. t. u. (or other heat unit) than the scale deflection resulting from the presence of methane. In accordance with the present invention methane and hydrogen are caused to give separate effects, in the same manner as with carbon dioxide and hydrogen in the fuel-air ratio indicator, and an indication of the true heat content of the gas is obtained by combining these two effects from the methane and hydrogen, the effects being impressed in the proportions corresponding to the combustible values of the two gases. Thus, the combustible value of the total gas mixture is indicated regardless of which of these two gases, hydrogen or methane, is present, or if both are present, regardless of their relative proportions.

Referring particularly to Figure 1 of the drawings, an instrument is represented schematically which is similar in some respects to the Shakespear katharometer referred to above. However, this instrument is a simplified embodiment of the present invention and differs from the katharometer in principle of operation and in construction. This instrument is basically a Wheatstone bridge having four resistance elements 2, 4, 6, and 8 joined in legs at junctures 3, 5, 7, and 9 with a battery 10 connected between the junctures 3 and 7 and a galvanometer 12 connected across junctures 5 and 9. Elements 6 and 8 are standard resistors which are separately enclosed in glass envelopes in an atmosphere of dry air, and elements 2 and 4 are positioned in a block 18 and adapted to be subjected to an atmosphere of the gas mixture which is being tested. Elements 2 and 4 are represented for convenience as being connected at their lower ends to block 18 and at their upper ends they are connected by leads (which extend through insulation) respectively to junctures 5 and 9 of the bridge. Element 2 has low resistance and during use it is maintained at a temperature approximately two hundred degrees above room temperature and element 4 is of relatively high resistance and is maintained at a temperature of approximately sixty degrees above room temperature.

The Shakespear katharometer is basically a Wheatstone bridge which has at least one of its legs formed by a sensing resistance element which is heated in the presence of a gas under test; another leg is formed by a similar element which is also heated but is in the presence of air which is used as a standard gas for comparison. The resistance of each of these elements depends upon its temperature and therefore upon the thermal conductivity of the surrounding gas. The bridge is arranged so that it is balanced when the sensing element is surrounded by a gas having the same conductivity as air. However, when the sensing element is surrounded by a gas having a thermal conductivity other than that of the standard gas, the bridge causes unbalance due to the change in the resistance of the sensing element caused by the change in its temperature. For example, if a gas mixture including hydrogen is in contact with the sensing element, the thermal conductivity is high and the temperature and the resistance of the element falls. This unbalances the bridge and gives an indication on the galvanometer which may be calibrated to indicate directly the percentage of hydrogen. The thermal conductivity of carbon dioxide is less than air and therefore the presence of carbon dioxide is indicated by the unbalancing of the bridge in the direction opposite to that caused by hydrogen.

With instruments of this type and in the present application the term "air" has been used as meaning a gas mixture composed mainly of nitrogen and oxygen. With the katharometer the air is saturated with water, and means is provided to insure that the gas being tested is also saturated with water. Under some circumstances it is desirable to use a single gas such as nitrogen instead of air as the standard for comparison. With the present illustrative apparatus of Figure 1, dry air is used as the standard and the gas mixture being tested is passed through a suitable dehumidifying apparatus.

This apparatus in Figure 1 is adapted for use in the analysis of exhaust gases from an internal combustion gasoline engine. It has been found that the fuel-air ratio for one hundred per cent combustion is approximately seven parts of fuel to one hundred parts of air, or .07. With this condition, the exhaust gas contains some carbon dioxide and no hydrogen. As the fuel-air ratio changes from this ideal condition into the excess fuel zone, the exhaust gases contain increasing amounts of hydrogen, and as the fuel-air ratio changes into the excess air range, the exhaust gases contain decreasing amounts of carbon dioxide. If an instrument is provided to merely measure the thermal conductivity of these exhaust gases, a minimum value is approached at approximately the point of complete combustion. However, the indicator on such an instrument "turns back" at the point of complete combustion, and it is not possible to detect without experimentation whether carbon dioxide or hydrogen is present, i. e., whether the mixture is "too lean" or "too rich." In accordance with the present invention the instrument will indicate directly whether the mixture is "too lean" or "too rich," and the proper adjustment may be made without experimentation.

In accordance with the present invention, advantage is taken of the fact that the thermal conductivities of various gases vary at different rates with changes in the temperature of the sensing element. That is, for example, as the element is heated above room temperature the sensitivity to hydrogen increases steadily, and the sensitivity to carbon dioxide increases rapidly at first and then remains substantially constant throughout a wide range of operation. Furthermore, the indication resulting from the presence of hydrogen is in one direction as a result of the fact that the thermal conductivity of hydrogen is greater than air, whereas, the indication resulting from the presence of carbon dioxide is in the other direction as a result of the fact that the thermal conductivity of carbon dioxide is less than air.

At approximately sixty degrees centigrade above room temperature, the presence of ten per cent of hydrogen causes an indication on the galvanometer in one direction which is eight times the indication caused by the presence of the same percentage of carbon dioxide, and this latter indication is in the opposite direction; at approximately one hundred degrees rise this ratio is ten to one and at approximately two hundred degrees this ratio is fifteen to one. When curves are plotted of these two sensitivities using sensitivity as the axis of ordinates and using degrees rise in temperature above room temperature as the axis of abscissa, the hydrogen curve is substantially a straight line, and the carbon dioxide curve starts down and then levels off quickly to about one hundred twenty degrees temperature rise and then it starts up again to the zero line.

It will be seen that two elements having the same physical dimensions and heated to different temperatures in a particular gas mixture will give different indications for a given percentage of hydrogen. However, by increasing the length of the low-temperature element, the indication for a specific percentage of hydrogen can be made equal to the indication of the high-temperature element. Therefore, by placing these two elements in adjacent legs of a Wheatstone bridge so that their "indications" or resistance changes due to the presence of hydrogen, are opposed to each other, the bridge will not be unbalanced by the presence of hydrogen in the gas mixture under test. However, since the rate of change of sensitivity to carbon dioxide differs from that of hydrogen, the effect of the presence of carbon dioxide is not exactly counterbalanced, and therefore, the bridge is sensitive to carbon dioxide, and may be calibrated to indicate the carbon dioxide concentration in per cent. Similarly, the relative values of the resistances of the two elements may be adjusted to make the bridge insensitive to carbon dioxide in any concentrations and thus the bridge would be sensitive to hydrogen. With these two arrangements as extremes it can be seen that a bridge can be provided which will be equally sensitive to hydrogen and carbon dioxide, or more sensitive to one of these gases than to the other. Furthermore when the bridge is sensitive to two gases, the deflection for one gas may be in one direction and for the other gas in the opposite direction, or the deflection may be in one direction for both gases.

Reverting now specifically to the illustrative apparatus represented in Figure 1 the low temperature element 2 and the high temperature element 4 are so proportioned that they operate in opposition and give an indication of carbon dioxide and hydrogen present in the exhaust gas. The actual commercial embodiment of the apparatus of Figure 1 includes four sensitive elements, and Figure 2 is a schematic representation of the entire exhaust gas analysis system. This apparatus is provided with a galvanometer calibrated to indicate on a scale the fuel-air ratio with the indication being determined by analysis of the exhaust gases in accordance with the system outlined above. Thus, at the center of the scale the fuel-air ratio of .07 is indicative of one hundred per cent combustion with no excess air. At the right of this is the excess fuel- or "too rich" zone, and at the left is the excess air or "too lean" zone. The readings at the left of the center result from the presence of carbon dioxide in the exhaust gas, whereas, the readings at the right of center result primarily from the presence of hydrogen in the exhaust gases. It is desirable that the scale have an even calibration, and this is obtained by providing a sensitivity to hydrogen which is approximately two and one-half times the sensitivity to carbon dioxide. This ratio gives the desired results in this particular instrument because with this the rate of change in fuel-air ratio is substantially the same for each unit change in indication.

Referring particularly to Figure 2, the gas sample of exhaust gas is taken from stack 20 of an internal combustion engine through a tube 22 and passes through a U-tube dryer 24 where all of the moisture is removed from the sample. Thus U-tube contains a replaceable solid material through which the gas sample flows and which readily absorbs all of the moisture in the sample. This material changes color when moisture is absorbed, and during use the material starts to change color adjacent the point of entry of the sample, and when the color change moves around the tube toward the point of exit of the sample, the tube is replaced with another tube containing fresh absorbent.

From U-tube 24 the sample passes through a tube 26 to block 28 where it flows in contact with four sensitive elements 30, 32, 34, and 36. The sample is exhausted at constant pressure at the right by a motor-driven fan 39. These sensitive elements are in pairs, elements 32 and 36 being low temperature elements and elements 30 and 34 being high temperature elements, and they are positioned respectively in the four legs of a Wheatstone bridge circuit. Element 30 is connected in series with a reference resistor 38, having a shunt 40, between junctures 42 and 44 of the bridge; element 34 is similarly connected in series with reference resistor 46, having a shunt 48 between junctures 50 and 52 of the bridge. Element 32 is connected in parallel with a shunt 54 and thence in series across junctures 44 and 52; similarly, element 36 is provided with a shunt 58 and is connected in series with a reference resistor 60, which has a shunt 62, between junctures 42 and 50. An additional adjusting resistor unit 64 is provided at juncture 50 there being an adjustable connection on the unit 64 for a galvanometer which is connected at its other side in series with a resistor 68 to juncture 44. Power is supplied to junctures 42 and 52 from a battery 70 which has a series adjusting resistor 72 and a ballast tube 74.

There is in the arm of the bridge circuit between junctures 42 and 44 a relatively low resistance sensitive element 30 in series with a relatively high resistance reference element 38, and thus the function of the shunt resistor 40 is to control the relative amount of current flowing through elements 30 and 38. The shunt resistor 40 is chosen to be a suitable value for shunting a portion of the current flowing through sensing element 30 around the relatively high resistance element 38, thus tending to cause element 38 to be maintained at a lower temperature than sensitive element 30. Likewise, in the arm of the bridge between junctures 44 and 52, the shunt resistor 54 serves to control the current through reference element 56 and relatively high resistance sensitive element 32, so that the element 56 is maintained at a higher temperature than the sensitive element 32. In the arm of the bridge between junctures 50 and 52 the shunt resistor 48 performs a function similar to resistor 40 in controlling the relative magnitudes of the currents through high temperature sensitive element 34 and reference element 46. The shunt resistor 58 similarly controls the amount of current flowing through the low temperature sensitive element 36 and high temperature element 60. The additional shunt resistance 62 is of a value to provide bridge balance in spite of slight variations in the various resistance values due to manufacturing tolerances.

The operation of the apparatus will be explained in connection with Figure 3 wherein the circuit of the system of Figure 2 is represented in simplified form. As pointed out above, the bridge has two low temperature elements and two high temperature elements; these elements are in pairs with one pair formed by elements 32 and 34 and corresponding respectively to elements 2 and 4 of Figure 1. The other pair is formed by elements 30 and 36, and they operate in the same manner as to elements 2 and 4. Thus, the bridge of Figures 2 and 3 operates in the same manner as does the bridge of Figure 1, but in Figures 2 and 3 an indication or signal is obtained which is twice the magnitude of that of Figure 1. Elements 32 and 36 have corresponding reference elements 38 and 46, and elements 30 and 34 have corresponding reference elements 56 and 60. Although all four of the sensitive elements are sensitive to both carbon dioxide and hydrogen, the low temperature elements are more sensitive to carbon dioxide, whereas, the high temperature elements are more sensitive to hydrogen. During use, the exhaust gases in contact with the four elements cause a deflection on the galvanometer which results from the presence of carbon dioxide and/or hydrogen. As indicated above, the scale is so calibrated that a direct indication is given of the fuel-air ratio, and if this ratio is not proper, a suitable adjustment can be made without experimentation.

This instrument can be made sensitive to one or more gases other than hydrogen and carbon dioxide; for example, when it is desired to test the combustion value of a gas containing methane and hydrogen, elements are provided which are so related to each other that they indicate the presence of methane and the presence of hydrogen in an additive sense by a single indication. However, the instrument is made more sensitive to methane than to hydrogen by such a ratio that account is taken of the fact that methane produces much more heat when burned than does hydrogen.

As various embodiments may be made of the above invention and as changes might be made in the embodiment above set forth, it is to be understood that all matter hereinbefore set forth or shown in the accompanying drawings is to be interpreted as illustrative and not in a limiting sense.

I claim:

In apparatus for analyzing a gas mixture to determine effectively the concentration of a particular component of said mixture by measuring the variations in the thermal conductivity of said mixture with respect to a reference gas, in combination, a bridge circuit having a pair of input terminals and first, second, third, and fourth arms, said first and second arms comprising one side of the bridge and being connected in series between said input terminals, said third and fourth arms comprising another side of the bridge and also being connected in series between said input terminals, an output terminal in said first side between said first and second arms, a second output terminal in said second side between said third and fourth arms, and an electrical indicating instrument connected between said output terminals, said first arm comprising a relatively low resistance sensitive element adapted to be immersed in the gas mixture and connected in series with the parallel combination of a current control resistor and a relatively high resistance reference element adapted to be immersed in the reference gas, said second arm comprising a relatively low resistance reference element corresponding with said first-arm sensitive element and adapted to be immersed in the reference gas and connected in series with the parallel combination of a current control resistor and a relatively high resistance sensitive element corresponding to said first-arm reference element and adapted to be immersed in the gas mixture, said third arm comprising a relatively low resistance sensitive element adapted to be immersed in the gas mixture and connected in series with the parallel combination of a current control resistor and a relatively high resistance reference element adapted to be immersed in the reference gas, and said fourth arm comprising a relatively low resistance reference element corresponding with said third-arm sensitive element and adapted to be immersed in the reference gas and connected in series with the parallel combination of a current control resistor and a relatively high resistance sensitive element corresponding to said third-arm reference element and adapted to be immersed in the gas mixture.

JOHN G. FLEMING.

REFERENCES CITED

The following references are of record in the file of this patent:

UNITED STATES PATENTS

| Number | Name | Date |
|---|---|---|
| 2,114,383 | Jacobson | Apr. 19, 1938 |
| 2,154,862 | Olshevsky | Apr. 18, 1939 |
| 2,237,558 | Hutton | Apr. 8, 1941 |
| 2,255,551 | Willenborg | Sept. 9, 1941 |

FOREIGN PATENTS

| Number | Country | Date |
|---|---|---|
| 425,518 | Germany | Feb. 20, 1926 |